United States Patent
Shimamura et al.

(10) Patent No.: US 9,377,071 B2
(45) Date of Patent: Jun. 28, 2016

(54) PAD SPRING FOR DISK BRAKE

(71) Applicant: AKEBONO BRAKE INDUSTRY CO., LTD., Tokyo (JP)

(72) Inventors: Kenichi Shimamura, Tokyo (JP); Kotaro Mizukoshi, Tokyo (JP)

(73) Assignee: AKEBONO BRAKE INDUSTRY CO., LTD., Chuo-ku, Tokyo (JP)

( * ) Notice: Subject to any disclaimer, the term of this patent is extended or adjusted under 35 U.S.C. 154(b) by 0 days.

(21) Appl. No.: 14/534,447

(22) Filed: Nov. 6, 2014

(65) Prior Publication Data
US 2015/0122602 A1 May 7, 2015

(30) Foreign Application Priority Data
Nov. 7, 2013 (JP) .................. 2013-230815

(51) Int. Cl.
| F16D 65/40 | (2006.01) |
| F16D 65/097 | (2006.01) |
| F16D 65/00 | (2006.01) |
| F16D 55/228 | (2006.01) |

(52) U.S. Cl.
CPC .......... *F16D 65/0978* (2013.01); *F16D 55/228* (2013.01); *F16D 65/0006* (2013.01); *F16D 65/0977* (2013.01)

(58) Field of Classification Search
CPC .. F16D 65/40; F16D 65/0977; F16D 65/2265
See application file for complete search history.

(56) References Cited

U.S. PATENT DOCUMENTS

| 3,625,316 | A | * | 12/1971 | Mori | ..................... F16D 55/226 |
| | | | | | 188/73.35 |
| 4,463,837 | A | * | 8/1984 | Courbot | .............. F16D 55/2265 |
| | | | | | 188/73.38 |
| 7,837,015 | B2 | * | 11/2010 | Klement | ............. F16D 65/0977 |
| | | | | | 188/73.35 |
| 8,037,977 | B2 | * | 10/2011 | Arakawa | ............. F16D 65/0977 |
| | | | | | 188/250 E |
| 2006/0060430 | A1 | | 3/2006 | Schog et al. | |
| 2008/0006489 | A1 | | 1/2008 | Morio et al. | |
| 2015/0027822 | A1 | | 1/2015 | Cerutti et al. | |

FOREIGN PATENT DOCUMENTS

| DE | 202008013343 U1 | 1/2009 |
| JP | 2006-520449 A | 9/2006 |
| WO | WO 2013/042062 A2 | 3/2013 |

OTHER PUBLICATIONS

Extended European Search Report dated Mar. 25, 2015 from corresponding European Application No. 14 19 2018 (6 pages).

* cited by examiner

*Primary Examiner* — Christopher Schwartz
(74) *Attorney, Agent, or Firm* — Drinker Biddle & Reath LLP

(57) ABSTRACT

A pad spring for a disk brake includes a mounting portion configured to be elastically mounted onto radial outside portions of pad support members of the disk brake; a pressure portion having a pair of pressure arms configured to elastically press outer circumferential edges of circumferential-direction one-end portions of back plates of pads of the disk brake inwardly in a radial direction of a rotor of the disk brake; and a held plate section formed between torque transmission surfaces of the back plates and torque receiving surfaces of the pad support members. The pad spring is formed by bending an elastic and corrosion-resistant metal plate so as to elastically press the pads in the radial direction.

5 Claims, 15 Drawing Sheets

PAD SPRING FOR DISK BRAKE

BACKGROUND

The invention is related to an improved pad spring incorporated in a disk brake apparatus used to brake a vehicle such as an automobile. Specifically, the invention aims at realizing a structure which can stabilize the attitude of a pad while not in braking to effectively prevent occurrence of an abnormal noise called brake squeal.

In a disk brake apparatus used to brake a vehicle, a pair of pads are disposed to sandwich between them a rotor rotatable together with wheels and, in braking, the two pads are pressed against the two side surfaces of the rotor. The basic structure of such disk brake apparatus includes two kinds of structures of a floating type and an opposed piston type. FIGS. 8 to 12 show, of these two kinds of disk brake apparatuses, an example of the conventional structure of a floating caliper type of disk brake apparatus disclosed in the patent document 1.

Here, in the present specification and claims, "axial direction", "circumferential direction" and "radial direction" mean the axial direction, circumferential direction and radial direction of the rotor unless otherwise stated. Further, "entrance side" means the side of the caliper where the rotor rotating together with the wheel enters the caliper, while "escape side" means the side where the rotor comes off from the caliper.

In the disk brake apparatus of the conventional structure, a caliper 3 is supported shiftably in the axial direction on a support 2 fixed to a vehicle body while it is opposed to the inner side surface of a rotor 1. Thus, on the circumferential-direction two end portions of (the inner side portions 6 to be discussed later) of the support 2, there are provided slide pins 4a, 4b while they project toward the inner side portions. The slide pins 4a, 4b are respectively engaged with a pair of support arm portions 5 projectingly formed in the circumferential-direction two sides of the caliper 3, thereby supporting the caliper 3 shiftably in the axial direction relative to the support 2.

The support 2 is constitutes of an inner side portion 6 disposed on the inner side of the rotor 1 and an outer side portion 7 on the outer side, while they are connected together in their respective circumferential-direction two ends by a pair of connecting arm portions 8a, 8b disposed to straddle over the rotor 1. To the circumferential-direction two ends of the inner side and outer side portions 6 and 7, there are fixed pad pins 9a, 9b, 10a and 10b while they extend in the axial direction. On the other hand, inner side and outer side pads 11a, 11b are respectively constituted of linings 12, 12 and back plates 13, 13 attached to and supported by the backs of the linings 12, 12 and, in the circumferential-direction two ends of the back plates 13, 13, there are formed through holes 14a, 14b respectively. The pad pins 9a, 9b (10a, 10b) supported by the support 2 are loosely engaged into the respective through holes 14a, 14b. Using this structure, the two pads 11a, 11b are supported to be movable in the axial direction relative to the support 2.

The caliper 3 includes a cylinder portion 15 and a caliper pawl 16 while they sandwich the two pads 11a, 11b from the axial-direction two sides. The cylinder portion 15 incorporates therein a piston 17 for pressing the inner-side pad 11a toward the rotor 1.

To brake, pressure oil is fed into the cylinder portion 15 to allow the piston 17 to press the inner-side pad 11a against the inner side surface of the rotor 1. Then, as the reaction of this pressing force, the caliper 3 is shifted in the axial direction (toward the inner side), whereby the caliper pawl 16 presses the outer-side pad 11b against the outer side surface of the rotor 1. Thus, the rotor 1 is strongly held from both sides and is thereby braked.

In the disk brake apparatus of the above conventional structure, using the paired pad pins 9a, 9b, 10a, 10b respectively disposed in the axial direction, the two pads 11a, 11b are supported to be movable in the axial direction relative to the support 2. Thus, the shapes of the two pads 11a, 11b and support 2 can be formed symmetric with respect to their respective circumferential directions. This has an advantage in reducing the manufacturing cost of the disk brake apparatus.

However, in the disk brake apparatus of the above conventional structure, in braking, an abnormal sound called a clonk sound (click sound) is easy to occur. The reason for this is described with reference to FIG. 12.

When the rotation direction of the rotor 1 in the forward run of a vehicle is counterclockwise in FIG. 12, in braking, a brake tangential force F1 going toward the other side (in FIG. 12, the left side, escape side) in the circumferential direction is applied to the friction surface center A point of the lining 12 constituting the pad 11a. And, the pad 11a is slightly moved toward the other side in the circumferential direction, whereby the through hole 14a of the circumferential-direction one end portion (entrance side end portion) of the back plate 13 is engaged with the pad pin 9a fixed to the circumferential-direction one side portion of the support 2 to thereby support the brake tangential force F1 (that is, a so called pull anchor structure is established). Here, since the engagement portion between the through hole 14a and pad pin 9a is situated more inwardly in the radial direction than the action line of the brake tangential force F1, in the forward-run braking, to the pad 11a, there is applied the moment M1 based on the brake tangential force F1 to rotate the pad 11a counterclockwise.

On the other hand, in the vehicle backward-run braking, a brake tangential force F2 going toward the circumferential-direction one side (in FIG. 12, right side) is applied to the friction surface center A point. The pad 11a is slightly moved toward the circumferential-direction one side (entrance side) and the through hole 14b of the circumferential-direction other end portion of the back plate 13 is engaged with the pad pin 9b fixed to the circumferential-direction other end portion of the support 2 to thereby support the brake tangential force F2 (that is, a so called pull anchor structure is established). Here, since the engagement portion between the through hole 14b and pad pin 9b is situated more inwardly in the radial direction than the action line of the brake tangential force F2, in backward-run braking, to the pad 11a, there is applied the moment M2 based on the brake tangential force F2 to rotate the pad 11a clockwise.

Thus, in the disk brake apparatus of the conventional structure, the direction of the moment acting on the pad 11a (11b) in the forward-run braking and the direction of the moment acting on the pad 11a (11b) in the backward-run braking are opposite. Therefore, when the forward-run braking and backward-run braking are repeated, for example, in entering a vehicle into a garage in a parking lot, the pad 11a (11b) is caused to change its attitude greatly, specifically, it is rotated counterclockwise and clockwise. Therefore, the attitude of the pad 11a (11b) becomes unstable, whereby an abnormal sound called brake squeal is easy to occur and a clonk sound (click sound) is easy to occur.

Here, the above problem is not limited to the disk brake apparatus of a floating type but can occur similarly in a disk brake apparatus of an opposed piston type.

FIGS. 13 to 15 show an example of a disk brake apparatus according to the unpublished last invention that the inventors et al. have developed in view of the above circumstances. In the illustrated example, a pair of inner side and outer side pads 18a, 18b are incorporated in a disk brake apparatus 19 of an opposed piston type.

A caliper 20 constituting the disk brake apparatus 19 supports two pads 18a, 18b movably in the axial direction (the vertical direction of FIG. 13, the front and back directions of FIGS. 14, 15). The caliper 20 includes an inner body portion 21 and an outer body portion 22 disposed to hold the rotor 1 (see FIG. 10) between them, connecting portions 23a, 23b respectively for connecting together the end portions of the circumferential-direction one side (the right side of FIGS. 13 to 15, the entrance side in the vehicle forward run) of the inner and outer body portions 21, 22 and the end portions of the circumferential-direction other side (the left side of FIGS. 13 to 15, the escape side in the vehicle forward run), a central bridge portion 24 for connecting together the circumferential-direction central portions of the inner and out body portions 21, 22. A portion intervening between the circumferential-direction one end side connecting portion 23a and central bridge portion 24 and a portion intervening between the circumferential-direction other end side connecting portion 23b and central bridge portion 24 are respectively formed as window portions 30a, 30b respectively having a substantially rectangular shape in their plan views. Within each of the inner, outer body portions 21, 22, there are provided two inner cylinders and two outer cylinders. Within the inner cylinders and outer cylinders, there are oil tight mounted inner pistons and outer pistons to be movable in the axial direction. The caliper 20 is supported and fixed onto the vehicle body side (the knuckle of a suspension device) by a pair of mounting seats 25a, 25b provided in the inner body 21.

On the radial inner-end near sections of the circumferential-direction one-end near the inner body portion 21 and the outer body portion 22, there are supported and fixed (fixedly provided) a pair of pad pins 26a, 26b concentrically in the axial direction while their respective leading ends are projected from the axial-direction inside surfaces of the inner and outer bodies 21 and 22. Such portions of the pad pins 26a, 26b as project from the axial-direction inside surfaces of the inner body portion 21 and the outer body portion 22 are respectively formed in a cylindrical shape having a circular section. The pad pins 26a, 26b, in the forward run braking, are engaged with through holes 33 (to be discussed later) formed in the pads 18a, 18b to thereby support the brake tangential force F1 applied to the pads 18a, 18b.

Such end face of the connecting portion 23a covering the radial outer portions of the pad pins 26a, 26b as is opposed to the central bridge portion 24 in the circumferential direction is formed as a flat-surface shaped torque receiving surface 27 (existing on a virtual plane perpendicular to the brake tangential force). The torque receiving surface 27, in the backward run braking, is contacted with torque transmission surfaces 36 (to be discussed later) formed in the pads 18a, 18b to thereby support the brake tangential force F2 applied to the pads 18a, 18b.

On the other hand, the mutually opposed axial-direction inside surfaces of the circumferential-direction other-end near sections of the inner and outer body portions 21 and 22 respectively include a pair of guide walls 28 respectively raised in the axial direction and having a substantially fan-like shape in their front views. The guide walls 28 respectively include, in their radial middle portions, guide recess grooves 29 respectively opened in the axial-direction inside surface and circumferential-direction one side surface.

The pads 18a, 18b are respectively constituted of linings (friction members) 31, 31 and metal-made back plates (pressure plates) 32, 32 supporting the backs of the linings 31, 31. The shapes of the circumferential-direction two end portions of the pads 18a, 18b (lining 31 and back plate 32) are asymmetric (the shapes of such two portions as including the center axis of the rotor 1 and sandwiching a virtual plane passing through the pad friction center A are asymmetric) with respect to the circumferential direction. That is, in the circumferential-direction one-end portions (entrance side end portions) of the back plates 32, 32, there are formed raised portions 34 having the through holes 33 for insertion of the pad pins 26a, 26b, whereas in the circumferential-direction other end portions (escape side end portions) of the back plates 32, 32, there are not formed such raised portions nor through holes, but there are formed ear portions 35 to be engaged with the guide recess grooves 29.

Specifically, in the radial inner end portions of the circumferential-direction one-end portions of the back plates 32, 32, there are formed substantially rectangular plate-shaped raised portions 34 projected toward the circumferential-direction one side. In such areas of the substantially central portions of the raised portions 34 as exist more inward in the radial direction than the action line of the brake tangential force applied in braking, there are formed the through holes 33 respectively penetrating through them in the axial direction and having a section of a substantially rectangular shape. On the other hand, in the radial middle portions of the side edges of the circumferential-direction other end portions of the back plates 32, 32, there are formed the projection-shaped ear portions 35 projected toward the circumferential-direction other side and smaller in size than the raised portions 34. The radial inside surfaces of the ear portions 35, in braking (in forward-run braking and backward-run braking), are contacted with the radial inside surfaces of the guide recess grooves 29 to thereby support the moment (rotation force) applied to the pads 18a, 18b. Further, of the side edges of the back plates 32, 32 on the circumferential-direction one side, in such areas of the radial outer end portions as exist more outward in the radial direction than the action line of the brake tangential force applied in braking and are opposed in the circumferential direction to the torque receiving surface 27 of the end face of the connecting portion 23a, there are formed torque transmission surfaces 36 each having a projectingly curved shape.

In this example, in order to support the above-structured two pads 18a, 18b movably in the axial direction relative to the caliper 20, the pad pins 26a, 26b are loosely inserted into the through holes 33 of the circumferential-direction one-end portions of the back plates 32, 32 and the ear portions 35 of the circumferential-direction other end portions of the back plates 32, 32 are loosely inserted into the guide recess grooves 29. Also, in this state, the torque transmission surfaces 36 of the circumferential-direction one-end portions of the back plates 32, 32 are disposed opposed to the torque receiving surfaces 27 in the circumferential direction.

In the above-structured prior invention, in braking, to the pads 18a, 18b, there is generated the moment having the following direction. This is described below specifically with reference to FIGS. 15A and 15B.

In the forward-run braking, as shown in FIG. 15A, to the friction surface center (pad effective diameter determined by the diameter, position and the like of the piston) A point of the lining 31 constituting the pad 18a (18b), there is applied the brake tangential force F1 going toward the other side (the left side of FIGS. 15A and 15B, escape side) in the circumferential direction. And, the pad 18a (18b) is moved slightly toward the other side in the circumferential direction, whereby the through hole 33 of the circumferential-direction one end portion of the back plate 32 is engaged with the pad pin 26a of the circumferential-direction one end near portion of the caliper 20 to thereby support the brake tangential force F1 (a so called pull anchor structure is established). Therefore, in the forward-run braking, to the pad 18a (18b), there is applied the moment M1 going to rotate the pad 18a (18b) counterclockwise, that is, to press down the circumferential-direction other side portion inwardly in the radial direction.

Also, in the vehicle backward-run braking, as shown in FIG. 15B, to the friction surface center A point, in a direction opposed in the circumferential direction to the brake tangential force F1 applied in the forward run, there is applied a brake tangential force F2 going toward the circumferential-direction one side (the right side of FIGS. 15A and 15B, or escape side). And, the pad 18a (18b) is moved slightly toward the circumferential-direction one side, whereby such the torque transmission surface 36, of the side edge portion of the back plate 32 on the circumferential-direction one end side, as exists more outward in the radial direction than the action line of the brake tangential force F2, is contacted with the torque receiving surface 27 to thereby support the brake tangential force F2 (a so called push anchor structure is established). Therefore, in the backward-run braking, to the pad 18a (18b), there is applied the moment M2 having a direction (the same direction as the moment M1) to rotate the pad 18a (18b) counterclockwise, that is, to press down the circumferential-direction other side portion inwardly in the radial direction.

As described above, in the structure of the prior invention, the directions of the moment M1, M2 acting on the pads 18a, 18b in the forward-run braking and backward-run braking can be made to coincide with each other. Therefore, even when the forward-run braking and backward-run braking are repeated, for example, when putting a vehicle in the garage in a parking lot, the attitudes of the pads 18a, 18b can be maintained in a state where they are left rotated counterclockwise. This can eliminate the need to change the attitudes of the pads 18a, 18b, thereby being able to prevent the occurrence of brake squeal and a clonk sound.

However, the structure of the prior invention as is, while not in braking, the pads 18a, 18b are easy to shake to facilitate the occurrence of brake squeal. Thus, firstly, the inventors devised an idea to mount a pad spring 37 as shown in FIGS. 16A to 16D onto the disk brake apparatus 19.

The pad spring 37 is made of an elastic and corrosion-resistant metal plate such as a stainless steel plate, has a substantially Q-like shape in its front view, and includes a mounting portion 38 and a pair of push-up arm portions 39, 39. The mounting portion 38 has an inverted-U shape in its front view and includes a partially arc-shaped base section 40 with its radial inner part opened and a pair of flat plate sections 41, 41 respectively extended inwardly in the radial direction from the two ends of the base section 40. The distance (opening width) between the opposed inside surfaces of the flat plate sections 41, 41 is smaller than the outside diameter dimension of the pad pins 26a, 26b, while the radius of curvature of the inner circumferential surface of the base section 40 is equal to or slightly larger than ½ of the outside diameter dimension of the pad pins 26a, 26b.

The push-up arm portions 39, 39 are respectively bent 90° from the radial inner ends of the flat plate sections 41, 41 in their mutually opposing directions (plate thickness direction) with respect to the circumferential direction, and are extended in the axial direction. The push-up arm portions 39, 39 include, in their leading ends, retaining sections 42, 42 rising outwardly in the radial direction.

The above-structured pad springs 37, 37, as shown in FIG. 17, while straddling over the pad pins 26a, 26b from outside in the radial direction (with the pad pins 26a, 26b inserted into the base portion 40), are disposed respectively between the inner body portion 21 and inner-side pad 18a and between the outer body portion 22 and outer-side pad 18b and are supported on the pad pins 26a, 26b, and are supported on the pad pins 26a, 26b respectively. In this state, the radial outside surfaces of the push-up arm portions 39, 39 extended inwardly in the axial direction from the mounting portion 38 are contacted with the radial inside surfaces of the raised portions 34, 34 of the back plates 32, 32 constituting the pads 18a, 18b, and the retaining sections 42, 42 are contacted with the axial-direction inside surfaces of the raised portions 34, 34 respectively.

The above-mounted pad springs 37, 37 elastically press the radial inside surfaces of the raised portions 34, 34 outwardly in the radial direction with taking the pad points 26a, 26b as a supporting point. Thus, while not in braking, the inner circumferential surfaces of the through holes 33 of the raised portions 34, 34 can be kept pressed elastically against the outer circumferential surfaces of the pad pins 26a, 26b. This can stabilize the attitudes of the pads 18a, 18b and thus can prevent the occurrence of brake squeal.

However, when the above-structured pad spring 37 is used, the assembling performance (operation efficiency) of the disk brake apparatus 19 can be inevitably degraded. That is, the pad springs 37, 37 cannot be mounted after the pad pins 26a, 26b are inserted into the through holes 33 of the pads 18a, 18b but must be mounted before insertion of the pad pins. This complicates the assembling operation of the disk brake apparatus 19 to degrade its assembling performance.

Also, since, in order to prevent the occurrence of rust in the torque transmission surface 36 and torque receiving surface 27 due to corrosion, highly corrosion-resistant members must be interposed between the surfaces 27, 36, it can be imagined that the pad springs 37, 37 should have such function additionally. However, since the pad springs 37, 37 are arranged at opposite positions to the surfaces 27, 36 with respect to the radial direction, it is difficult to provide the pad springs 37, 37 with such function additionally. Thus, in order to interpose a highly corrosion-resistant member between the surfaces 36 and 27, this member must be structured separately from the pad springs 37, 37, which increases the number of parts and thus the number of assembling steps and management man-hours.

Further, since the pad springs 37, 37, after mounted, cannot be confirmed visually from outside in the radial direction of the disk brake apparatus 19, an operation to check for forgetting of mounting is complicated.

[Patent document 1] JP-A-2006-520449

SUMMARY

It is therefore one advantageous aspect of the present invention to provide a disk brake pad spring which can prevent the occurrence of brake squeal while not in braking, prevent the degraded assembling performance of a disk brake apparatus and, without increasing the number of parts, can prevent the generation of rust on a torque transmission surface and a torque receiving surface.

According to one advantage of the invention, there is provided a pad spring for a disk brake, comprising:

a mounting portion configured to be elastically mounted onto radial outside portions of pad support members of the disk brake;

a pressure portion having a pair of pressure arms configured to elastically press outer circumferential edges of circumferential-direction one-end portions of back plates of pads of the disk brake inwardly in a radial direction of a rotor of the disk brake; and a held plate section formed between torque transmission surfaces of the back plates and torque receiving surfaces of the pad support members, wherein the pad spring is formed by bending an elastic and corrosion-resistant metal plate so as to elastically press the pads in the radial direction.

The pad spring may be configured such that:

each of the pads includes a lining and the back plate supporting a back surface of the lining, a torque transmission surface is formed in a side edge portion of one side of the back plate in a circumferential direction of the rotor, and is disposed at a position outside than a line of action of a brake tangential force applied to the pads in braking in one direction of the circumferential direction, a guided portion is formed in the side edge portion, and is disposed at a position inside than a line of action of a brake tangential force applied to the pads in braking in the other direction of the circumferential direction, the pad support member supports the pad so that the pad moves in an axial direction of the rotor, a torque receiving surface configured to come in contact with the torque transmission surface so as to support the brake tangential force in the one direction is formed on the pad support member, and a guide portion configured to be engaged with the guided portion so as to support the brake tangential force in the other direction is formed on the pad support member The held plate section elastically may press the pads in the other direction of the circumferential direction.

The pressure arms may respectively press the pads in directions in which the pads are separated from each other with respect to an axial direction of the rotor.

The pad spring may be configured to be partially exposed outwardly in the radial direction in a state that the pad spring is mounted to the pad support members.

BRIEF DESCRIPTION OF DRAWINGS

FIG. 5A is a front view, FIG. 5B is a plan view and FIG. 5C is a right side view.

FIG. 15A shows the forward-run braking state and FIG. 15B shows the backward-run braking state.

FIG. 16A is a front view, FIG. 16B is a plan view, FIG. 16C is a right side view and FIG. 16D is a perspective view.

DETAILED DESCRIPTION OF EXEMPLIFIED EMBODIMENTS

[First Embodiment]

Figure 13:
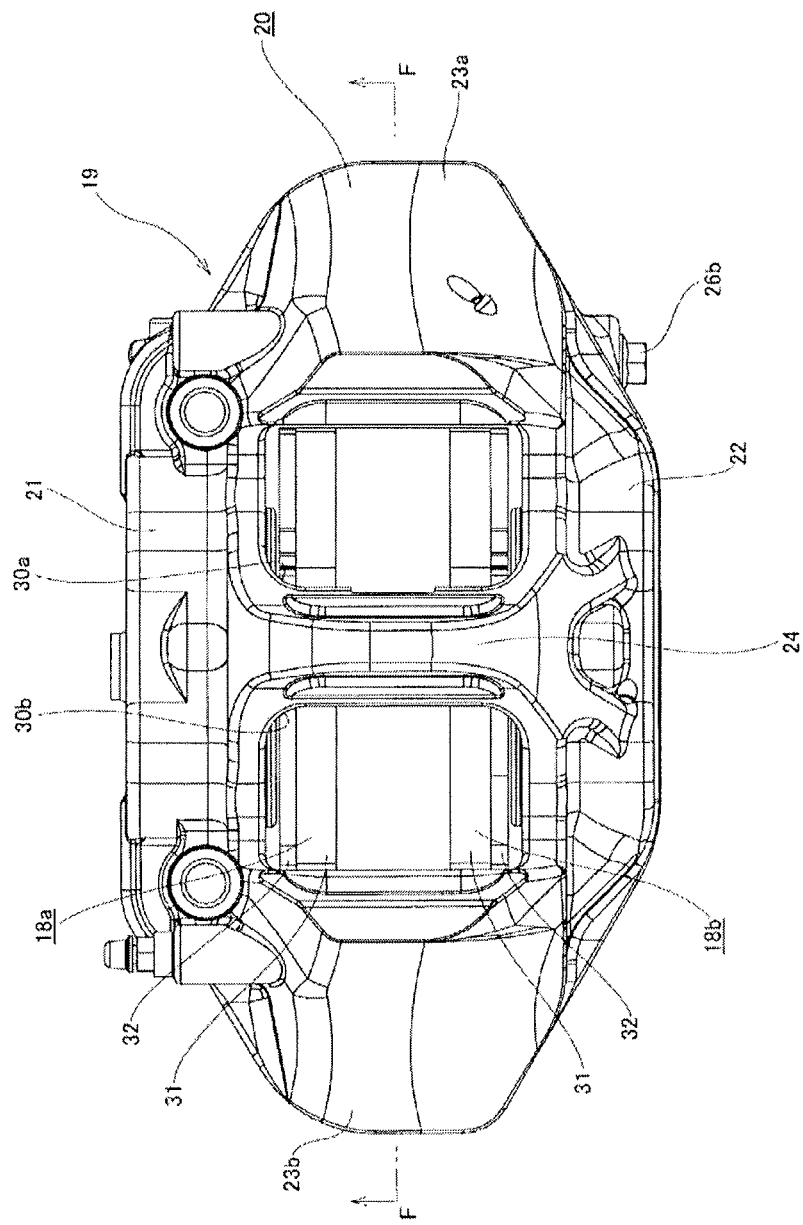
FIG. 13 is an orthogonal projection view of an opposed piston type disk brake apparatus of an inventors' prior invention, when viewed from outside in the radial direction.
Figure 14:
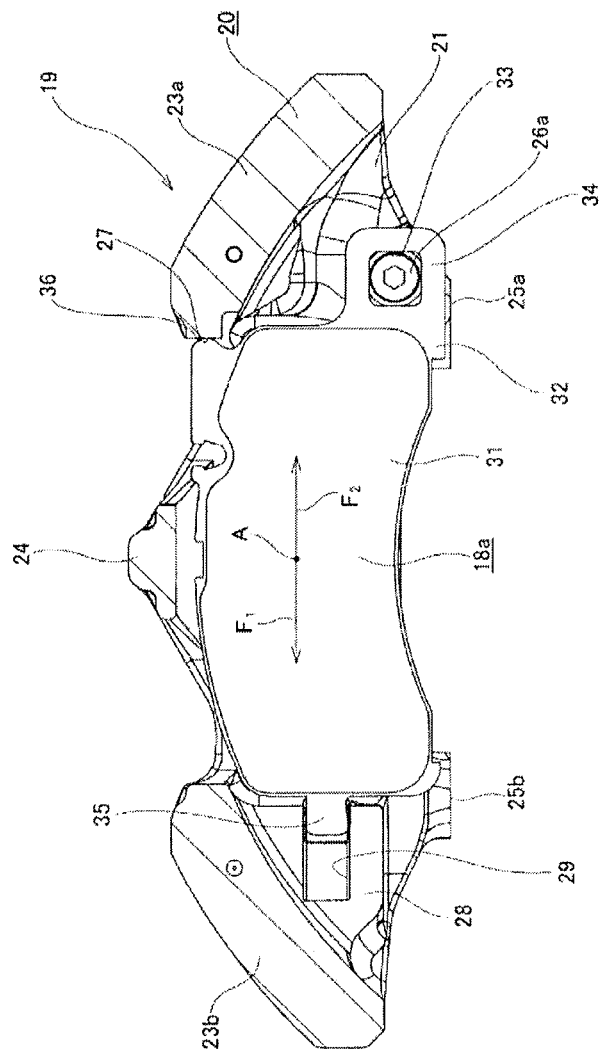
FIG. 14 is a section view of the prior invention, taken along the F-F line of FIG. 13.
Figure 15A:
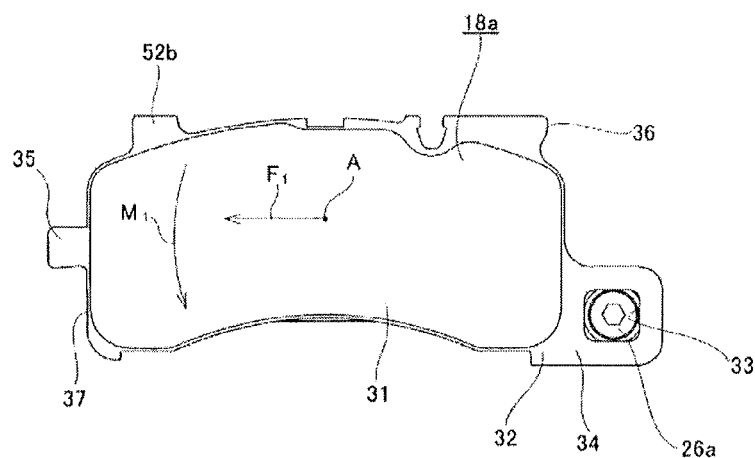
FIGS. 15A and 15B are front views of a pad included in the prior invention. Specifically.
Figure 15B:
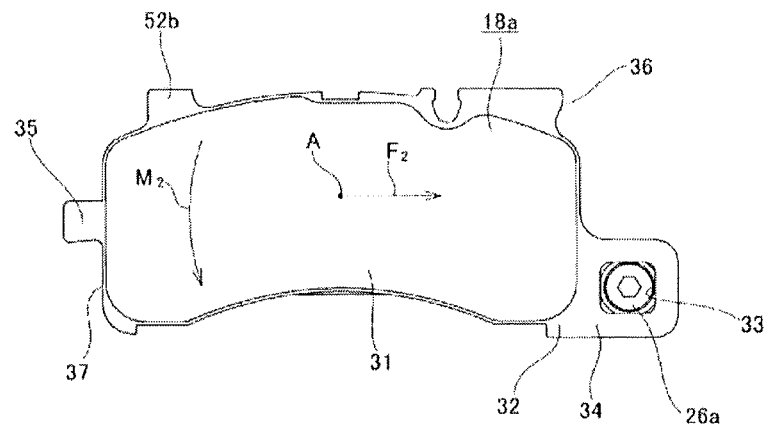
Figure 16A:
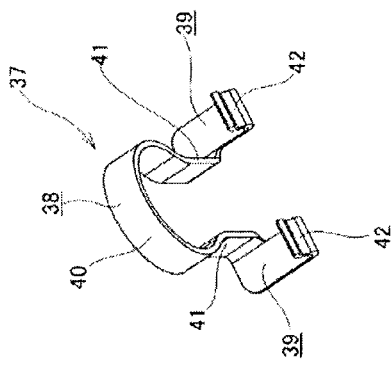
FIGS. 16A to 16D show a pad spring included in the prior invention. Specifically.
Figure 16B:
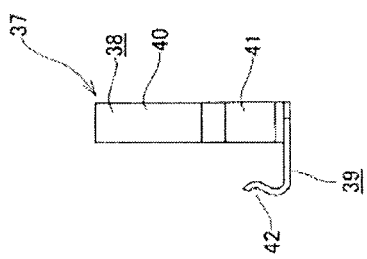
Figure 16C:
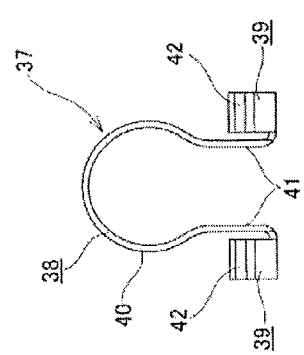
Figure 16D:
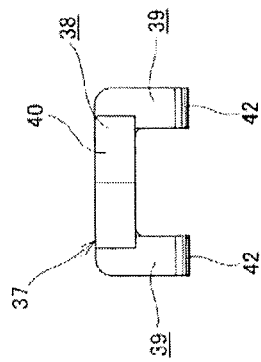
Figure 17:
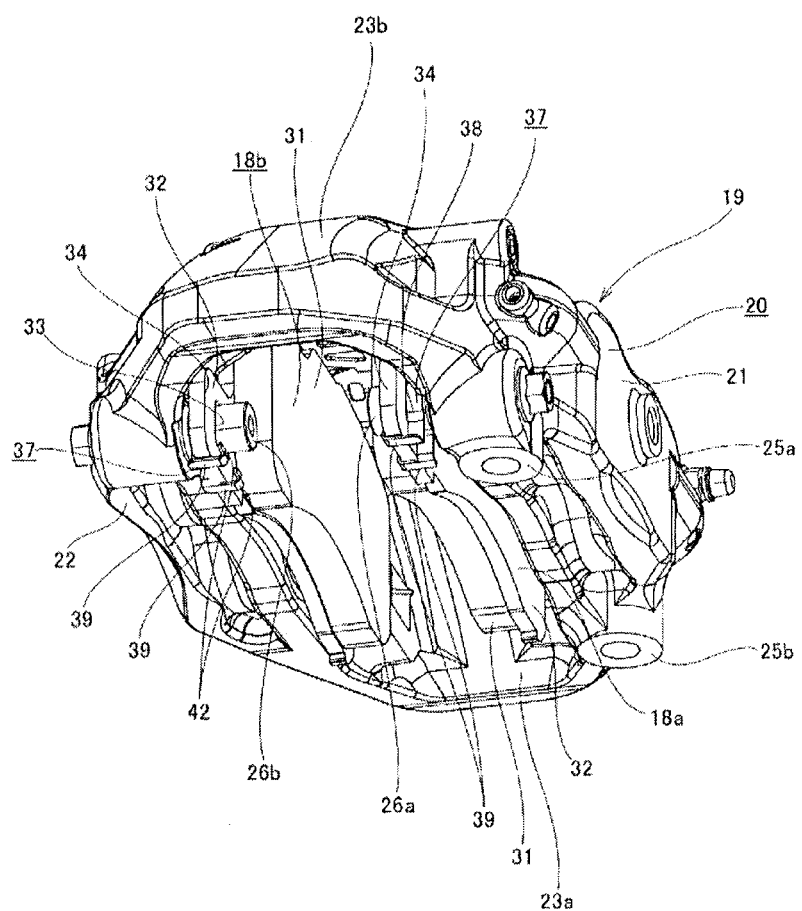
FIG. 17 is a perspective view of a disk brake apparatus with the pad spring of the prior invention mounted thereon, when viewed from the inner side of the apparatus and from inwardly in the radial direction.

FIGS. 1 to 6 show a first embodiment of the invention. This embodiment is characterized in that, by improving the structure of a pad spring 43 to be mounted on a disk brake apparatus 19, the pad spring 43 can also have a function to prevent the occurrence of rust on a torque transmission surface 36 and a torque receiving surface 27. The structure and operation effects of a disk brake apparatus on which the pad spring 43 is mounted are basically the same as the prior invention shown in the previously described FIGS. 13 to 15. Therefore, the illustration and description of the equivalent portions are omitted or simplified and thus description is given below mainly of the characteristic portions of the embodiment and portions not described before.

Figure 1:
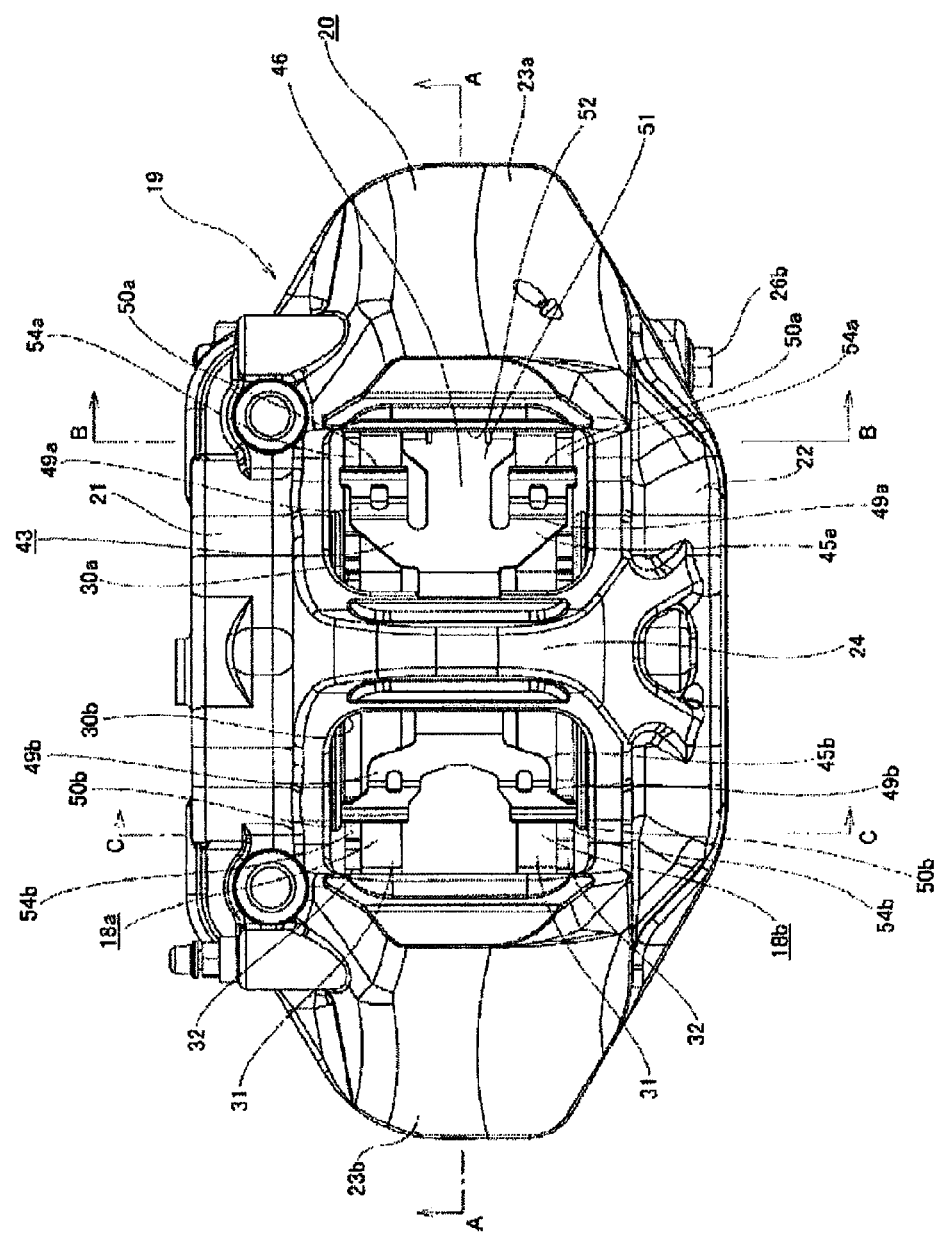
FIG. 1 is an orthogonal projection view of a disk brake apparatus with a pad spring according to a first embodiment of the invention mounted thereon, when viewed from outside in the radial direction.
Figure 2:
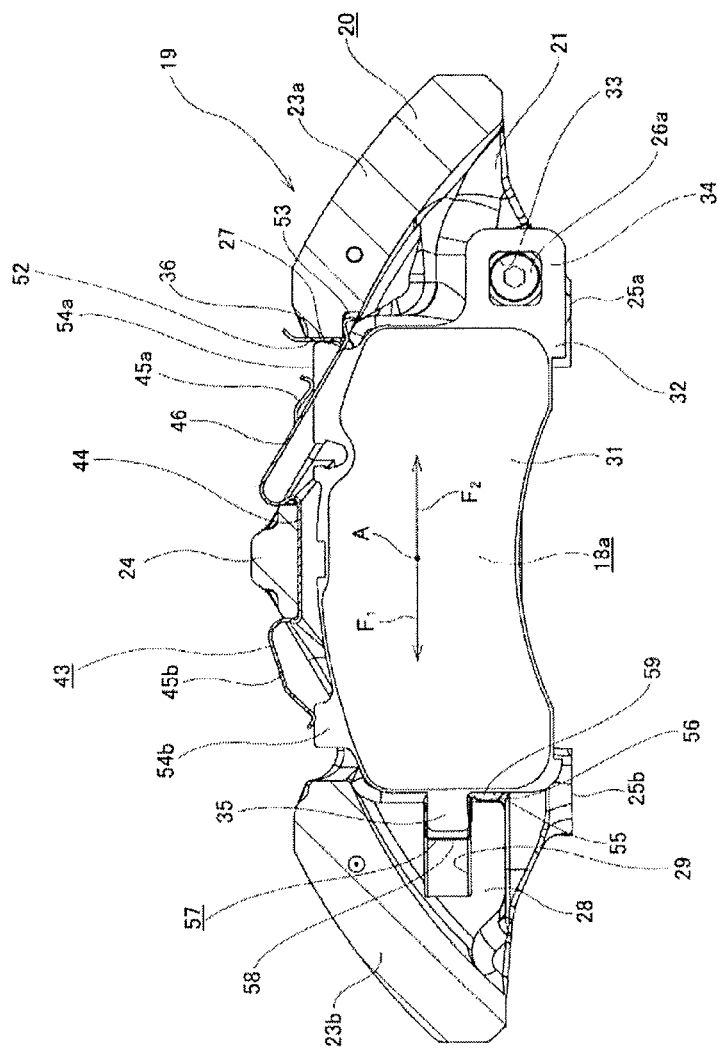
FIG. 2 is a section view of the apparatus taken along the A-A line of FIG. 1.
Figure 3:
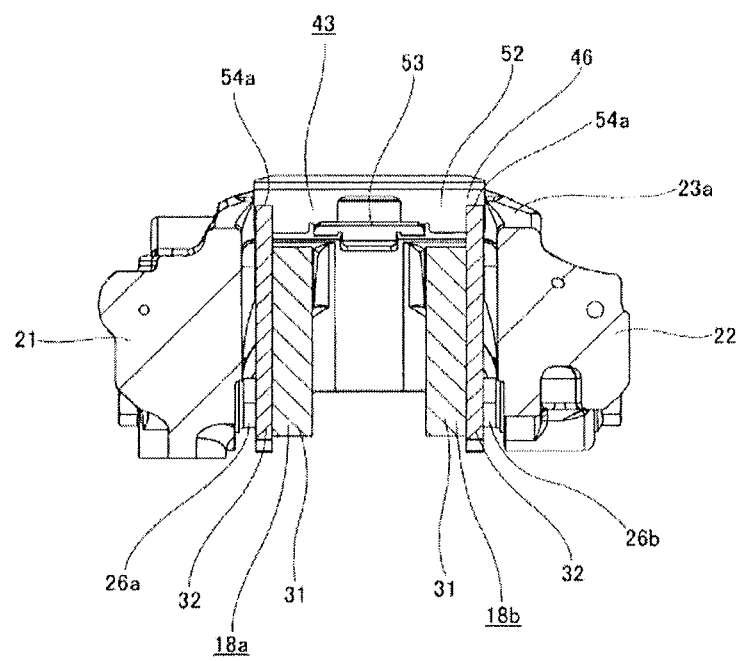
FIG. 3 is a section view of the apparatus taken along the B-B line of FIG. 1.
Figure 4:
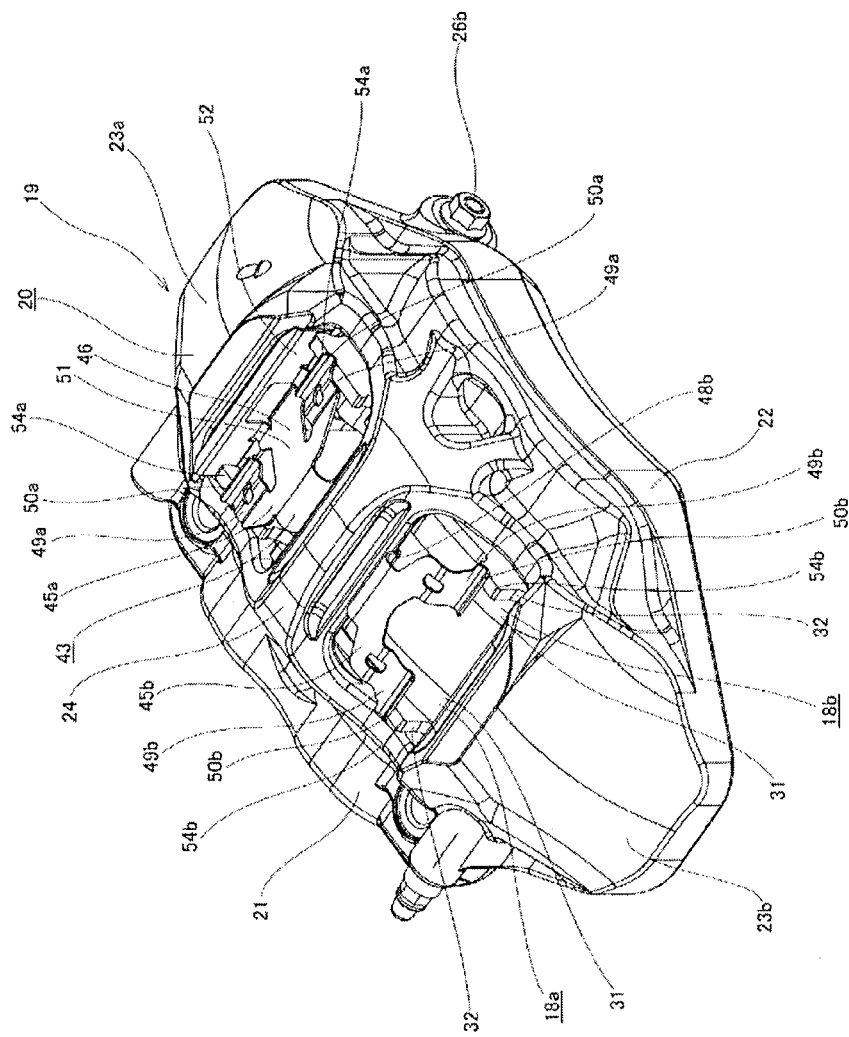
FIG. 4 is a perspective view of the apparatus, when viewed from the outer side thereof and from outside in the radial direction.
Figure 5A:
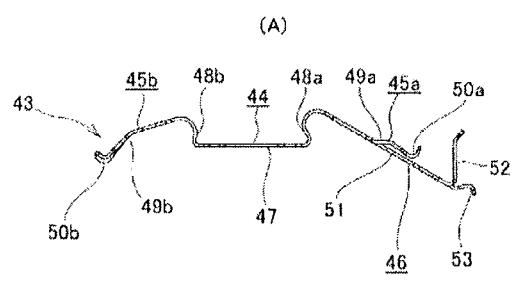
FIGS. 5A to 5C show the pad spring. Specifically.
Figure 5C:
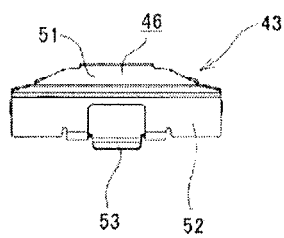
Figure 5B:
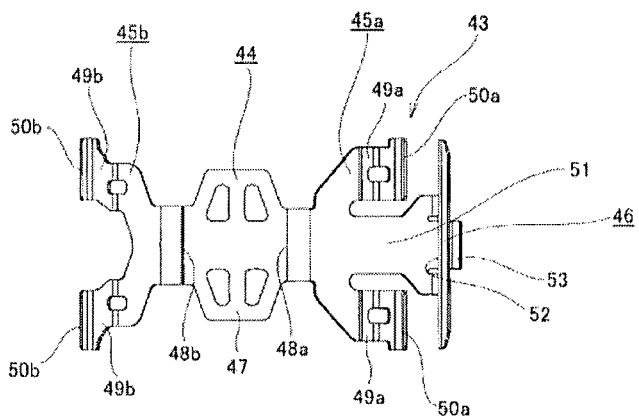

In this embodiment, only one pad spring 43 as shown in FIGS. 5A and 5B is mounted on a caliper 20 corresponding to a pad support member stated in Claims. The pad spring 43, which is formed by bending an elastic and corrosion-resistant metal plate such as a stainless steel plate, includes a mounting portion 44 formed in its circumferential-direction middle portion, two pressure portions 45a, 45b formed in its circumferential-direction two ends and each having a substantially U-like shape in its plan view, and a holding portion 46 formed only in its circumferential-direction one end portion (in FIGS. 1, 2 4, in the right end portion which provides an entrance side end portion in the forward run of a vehicle) and having a substantially T-like shape in its plan view.

The mounting portion 44, which has a substantially U-shaped section, includes a substantially rectangular plate-shaped base plate section 47 contactable with the radial inside surface of the central bridge portion 24 so disposed in the caliper 20 as to cover the paired pads 18a, 18b from outside in the radial direction, and a pair of held plate sections 48a, 48b respectively formed bent outwardly in the radial direction from the circumferential-direction two ends of the central bridge portion 24 for elastically holding the central bridge portion 24 from both sides in the circumferential direction.

Figure 6:
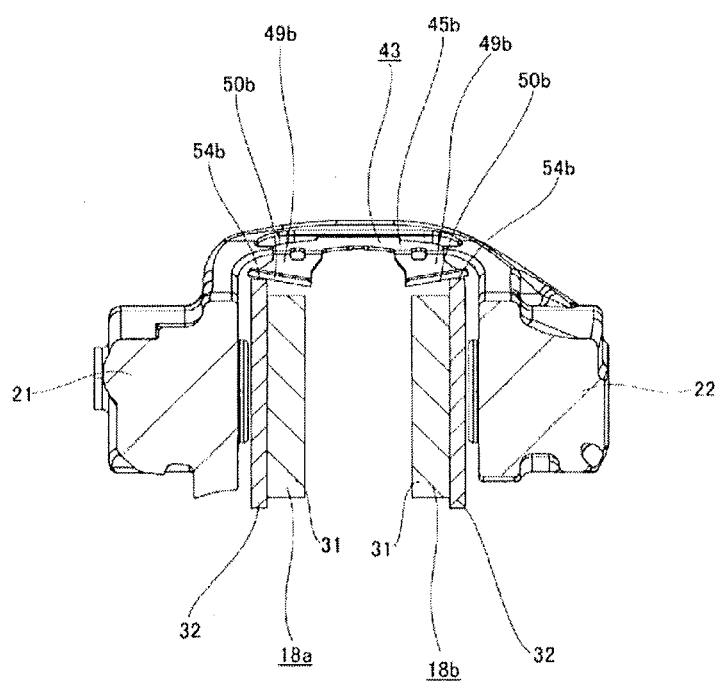
FIG. 6 is a section view of the pad spring taken along the C-C line of FIG. 1.

The pressure portions 45a, 45b, while the pad spring 43 is mounted, are respectively disposed inside the window portions 30a, 30b and include a pair of pressure arms 49a, 49a (49b, 49b) formed spaced in the axial direction from each other. The pressure arms 49a, 49a (49b, 49b) respectively include, in their leading end portions, pressing portions 50a, 50a (50b, 50b) each having a substantially U-shaped section. Of the pressure portions 45a, 45b, the pressing portions 50b, 50b constituting the pressure portions 45b on the circumferential-direction other side (the left side of FIGS. 1, 2 and 4 that provides the escape side in the vehicle forward run), as shown in FIG. 6, are inclined inwardly in the radial direction as they approach each other in the axial direction (as they approach the rotor 1).

The holding portion 46 is disposed to continue with the base end of the pressure portion 45a (pressure arm 49a, 49a) and includes a flat plate-shaped connecting plate section 51 inclined inwardly in the radial direction as it goes toward its leading end (toward the circumferential-direction one end), a held plate section 52 bent outwardly in the radial direction from the circumferential-direction one end of the connecting plate section 51, and an engagement section 53 having a substantially L-shaped section and formed by cutting out the width-direction (axial-direction) middle area of the held plate section 52 into a substantially rectangular shape and bending the area toward the circumferential-direction one end and inwardly in the radial direction.

To mount the above-structured pad spring 43 of this embodiment onto the central bridge portion 24, while the base plate section 47 constituting the mounting portion 44 is contacted with the radial inside surface of the central bridge portion 24, using the elastic forces of the two held plate sections 48a, 48b, the central bridge portion 24 may be held from both sides in the circumferential direction. And, in such mounted state, using the paired pressing portions 50a, 50a constituting the pressure portion 45a disposed on the circumferential-direction one side, shoulder portions 54a, 54a, which are formed in such outer circumferential edge portions of the back plates 32, 32 constituting the pads 18a, 18b as exist near their one-side ends in the circumferential direction, are elastically pressed inwardly in the radial direction and outwardly in the axial direction. And, using the paired pressing portions 50b, 50b constituting the pressure portion 45b disposed on the circumferential-direction other side, shoulder portions 54b, 54b formed in such outer circumferential edge portions of the back plates 32, 32 as exist near their other ends in the circumferential direction are elastically pressed inwardly in the radial direction and outwardly in the axial direction. Further, while the engagement section 53 constituting the holding portion 46 is elastically engaged with the inner circumferential surface of the connecting portion 23a on the circumferential-direction one end side, the held plate section 52 is interposed between the torque receiving surface 27 formed in the opposed end face of the connecting portion 23a to the central bridge portion 24 in the circumferential direction and the torque transmission surface 36 formed on the circumferential-direction one end side of each of the back plate 32, 32.

Also, in the embodiment, of the circumferential-direction one-side surfaces of the guide walls 28 formed in the mutually opposed axial-direction inside surfaces of the circumferential-direction other end neighboring portions of the inner body 21 and outer body 22, in the portions existing more inwardly in the radial direction than the openings of the guide recess-grooves 29, there are respectively formed auxiliary torque receiving surfaces 55 each having a flat surface shape (existing on a virtual plane perpendicular to a brake tangential force to be discussed later). On the other hand, of the circumferential-direction other end side edges of the back plates 32, 32 constituting the pads 18a, 18b, in the portions existing more inwardly in the radial direction than the portions where the ear portions 35 are formed, there are respectively formed auxiliary torque transmission surfaces 56 each having a flat surface shape. And, while the pads 18a, 18b are supported movably in the axial direction relative to the caliper 20 (the pad pins 26a, 26b are loosely inserted into the through holes 33 and the ear portions 35 are loosely inserted into the guide recess grooves 29), the torque transmission surfaces 36 of the circumferential-direction one-end side edges of the back plates 32, 32 are opposed in the circumferential direction (through the holding plate portions 52) to the torque receiving surfaces 27 of the end faces of the connecting portions 23a on the circumferential-direction one-end side, and the auxiliary torque transmission surfaces 56 on the circumferential-direction other end side are similarly opposed in the circumferential direction (through pressure receiving portions 59 to be discussed later) to the auxiliary torque receiving surfaces 55. Thus, in the forward-run braking, when the brake tangential force F1 applied to the pads 18a, 18b is excessively large, the auxiliary torque transmission surfaces 56 are contacted with the auxiliary torque receiving surfaces 55 to thereby support a portion of the brake tangential force F1.

In the above assembled state, pad clips 57 each made of an elastic and corrosion-resistant metal plate such as a stainless steel plate are respectively interposed between the circumferential-direction other end side edges of the back plates 32 and the guide wall portions 28. Each pad clip 57 includes an ear insertion portion 58 having a substantially U-shaped section and a pressure receiving portion 59 bent about 90° inwardly in the radial direction from the lower side of the ear insertion portion 58. The ear insertion portion 58 is interposed between the ear portion 35 and guide recess groove 29, while the pressure receiving portion 59 is interposed between the auxiliary torque transmission surface 56 and auxiliary torque receiving surface 55. Provision of such pad clips 57 can prevent the sliding portions between the back plates 32, 32 and guide wall portions 28 against rust and also can prevent the sliding portions against wear.

Each of the through holes 33 of the raised portions 34 of the back plates 32, 32 has a substantially rectangular-shaped section and its inner circumferential surface is constituted of four flat surfaces and four partially recessed cylindrical surfaces (chamfered portions) connecting together the flat surfaces adjoining each other in the circumferential direction. The distance between the paired flat surfaces opposed to each other in the radial direction and the distance between the paired flat surfaced opposed to each other in the circumferential direction are set equal to each other and larger than the outside diameter dimensions of the pad pins 26a, 26b. Here, in this embodiment, the pad pins 26a, 26b correspond to guide portions stated in Claims, while the through holes 33 similarly correspond to guided portions.

The above-structured embodiment can prevent the occurrence of brake squeal while not in braking, can prevent the degraded assembling efficiency of the disk brake apparatus 19 and, without increasing the number of parts, can prevent the torque transmission surfaces 36 and torque receiving surfaces 27 against rust.

That is, in this embodiment, using the pressing portions 50a, 50b (pressure arm 49a, 49b) constituting the paired pressure portions 45a, 45b formed on both sides in the circumferential direction of the pad spring 43, the shoulder portions 54a, 54b of the back plates 32, 32 can be elastically pressed inwardly in the radial direction. Therefore, while not in braking, such flat surfaces of the inner circumferential surfaces of the through holes 33 as exist outside in the radial direction can be contacted with the radial outer end portions of the outer circumferential surfaces of the pad pins 26a, 26b, and the radial inside surfaces of the ear portions 35 can be contacted with the radial inside surfaces of the guide recess grooves 29. This can stabilize the attitudes of the pads 18a, 18b to thereby prevent the occurrence of brake squeal.

Also, the mounting portion 44, using its own elastic force, can be mounted onto the central bridge portion 24 of the radial outside portion of the caliper 20. Therefore, the pad spring 43 of this embodiment can be mounted after the pad pins 26a, 26b are inserted into the through holes 33 of the pads 18a, 18b (pads 18a, 18b are supported on the caliper 20). This can prevent the degraded assembling efficiency of the disk brake apparatus 19 onto which the pad spring 43 of this embodiment is to be mounted.

Since the pad spring 43, as described above, is mounted on the same side (outwardly in the radial direction) as the torque transmission surface 36 and torque receiving surface 27 in the radial direction, the held plate section 52 to be interposed between the torque transmission surface 36 and torque receiving surface 27 can be arranged integrally with the mounting portion 44 and two pressure portions 45a, 45b. Therefore, in this embodiment, without increasing the number of parts (which increases the number of assembling steps and management man-hours), the torque transmission surface 36 and torque receiving surface 27 can be prevented against rust. And, the back plates 32, 32 can be smoothly shifted relative to the caliper 20.

Since the paired pressing portions 50b, 50b constituting the pressure portion 45b formed on the other side in the circumferential direction, as described above, are inclined, there can be applied to the pads 18a, 18b elastic forces going in mutually departing directions with respect to the axial direction. Therefore, while not in braking, the side surfaces (front surfaces) of the linings 31, 31 can be separated from the two side surfaces of the rotor 1 to prevent these side surfaces from rubbing against each other. Also, since the pressure portions 45a, 45b and holding portion 46 constituting the pad spring 43 are exposed from the window portions 30a, 30b outwardly in the radial direction, a checking operation to prevent forgetting mounting the pad spring 43 can be facilitated.

In the forward-run braking, when the brake tangential force F1 becomes excessively large and the pad pins 26a, 26b are thereby elastically deformed in the circumferential direction, the auxiliary torque transmission surfaces 56 can be contacted with the auxiliary torque receiving surfaces 55 to thereby support a portion of the brake tangential force F1. This can effectively prevent the pad pins 26a, 26b against damage such as breakage.

Since the through holes 33 are respectively formed to have a rectangular hole-like shape and the section shapes of the pad pins 26a, 26b are formed circular, the outer circumferential surfaces of the pad pins 26a, 26b can be contacted in line with the inner circumferential surfaces of the through holes 33. This can stabilize the contact state of the pad pins 26a, 26b with the through holes 33.

The other structures and operation effects of this embodiment including the coincidence of the directions of the moments in the forward-run braking and backward-run braking are similar to the structure of the previously described prior invention.

[Second Embodiment]

Figure 7:
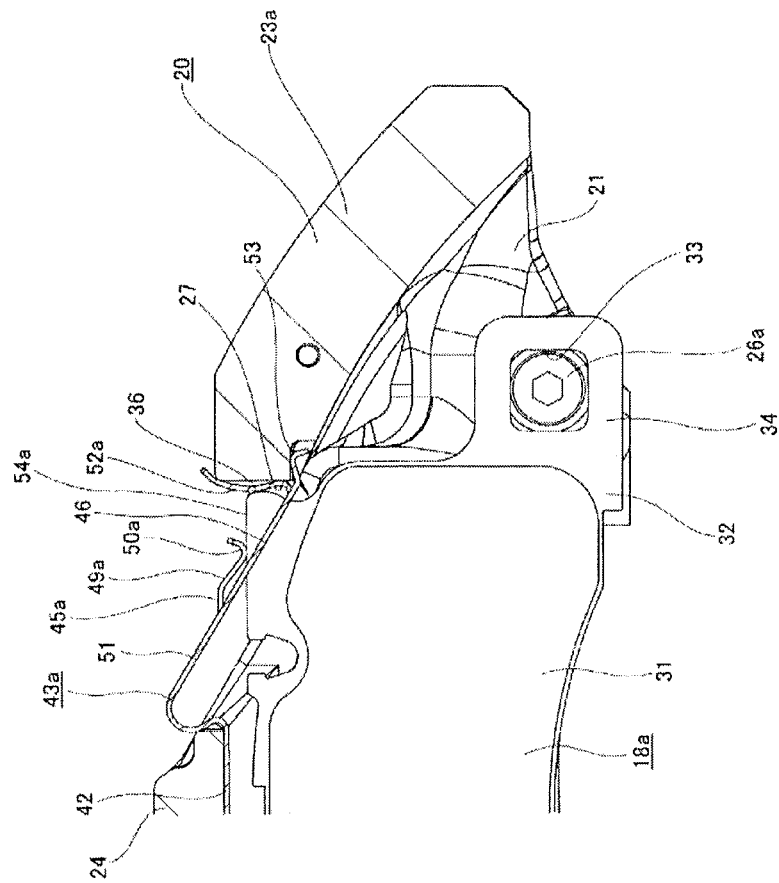
FIG. 7 shows a second embodiment of the invention, corresponding to the right half section of FIG. 2.
Figure 8:
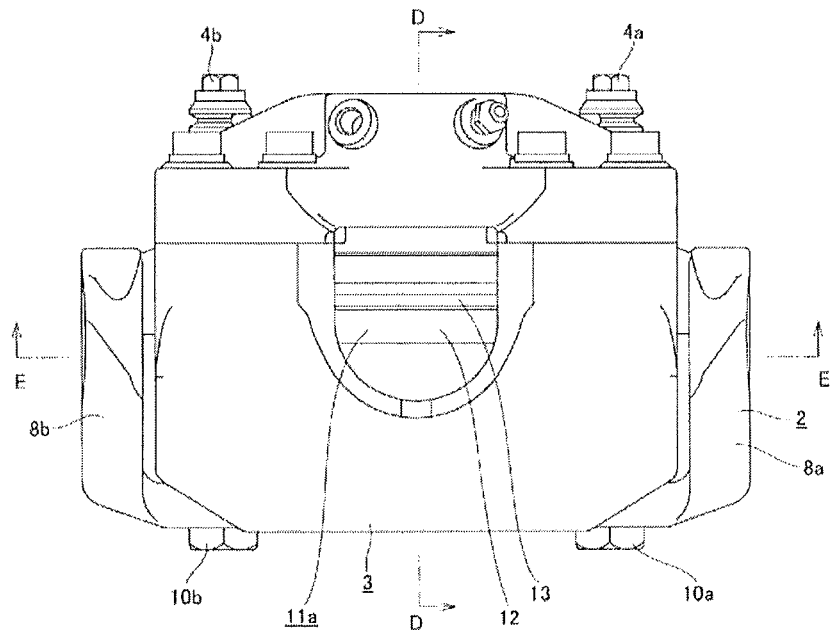
FIG. 8 is a plan view of a disk brake apparatus having a conventional structure.
Figure 9:
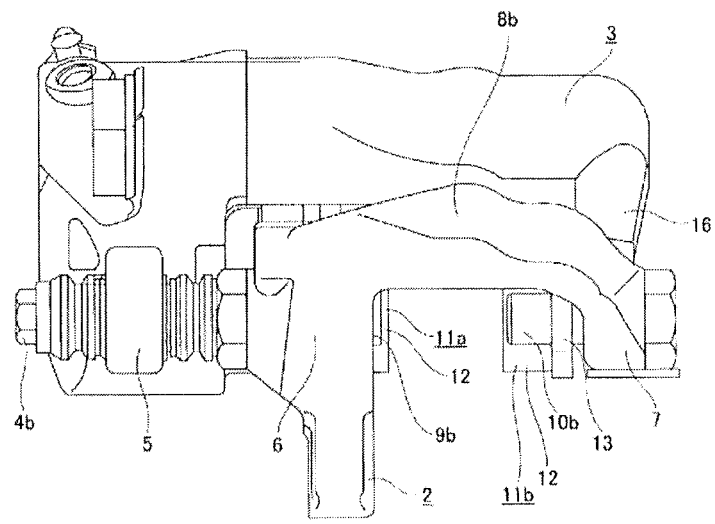
FIG. 9 is a left side view of the conventional structure.
Figure 10:
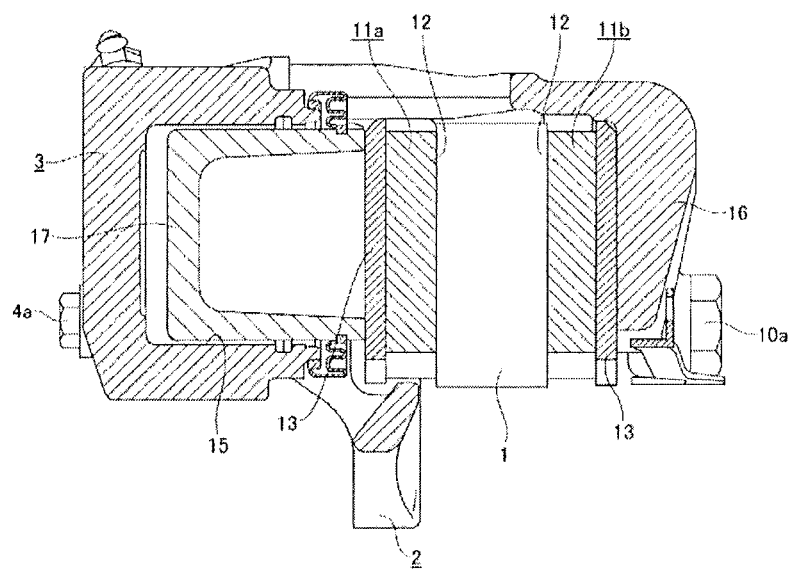
FIG. 10 is a section view of the conventional structure taken along the D-D line of FIG. 8.
Figure 11:
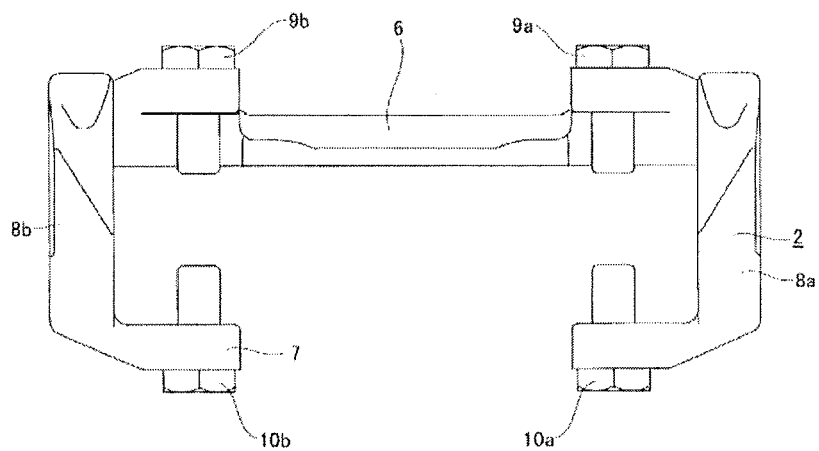
FIG. 11 is a plan view of a support included in the conventional structure.
Figure 12:
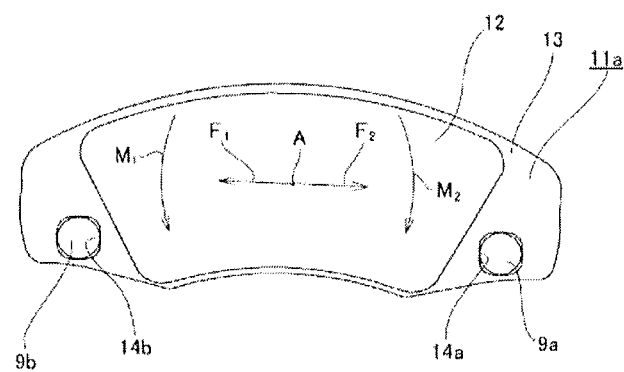
FIG. 12 is a section view of the conventional structure with the support and caliper removed therefrom, taken along the E-E line of FIG. 8.

FIG. 7 shows the second embodiment of the invention. This embodiment is characterized in that a held plate section 52a formed in a portion of a pad spring 43a has an arc-shaped section (an arc shape with its circumferential-direction other side raised). In this embodiment, while a pad 18a (18b) is assembled to a caliper 20, the held plate section 52a is elastically crushed in the circumferential direction between the torque transmission surface 36 and torque receiving surface 27. Thus, the pads 18a (18b) are elastically pressed toward the circumferential-direction other side by the held plate section 52a. The thus-structured second embodiment can prevent the torque transmission surface 36 from colliding strongly with the torque receiving surface 27 in the backward run braking, thereby preventing the occurrence of collision noises.

Here, as in the second embodiment, in order to prevent the torque transmission surface 36 from colliding strongly with the torque receiving surface 27, the held plate section may have a wave-shaped section or a shape inclined with respect to the torque receiving surface 27 (a shape in which the clearance between itself and torque receiving surface 27 varies greatly and slightly with respect to the radial direction.

The other structures and operation effects of the second embodiment are similar to the first embodiment.

The disk brake pad spring of the invention is not limited to the structures of the embodiments in which a pair of pressure portions are formed on the circumferential-direction two sides of the mounting portion, but the pressure portion on the circumferential-direction other side may be omitted so long as at least the pressure portion on the circumferential-direction one side is formed. Also, the disk brake pad spring of the invention can be applied not only to the opposed piston type disk brake apparatus as described with reference to the above embodiments but also to the floating caliper type disk brake apparatus as shown in FIGS. 8 to 12. The disk brake apparatus to which the invention is applied can employ not only the structure using the pad pins as the guide portions and the through holes (or cut-outs including discontinuous portions) as the guided portions but also other structures, for example, a structure in which guide portions and guided portions are unevenly engaged with each other (a structure in which one of them is formed as a raised engagement portion and the other as a recessed engagement portion). The invention can be applied not only to the structure in which, as described in the columns of the embodiments (and the columns of the prior invention), the circumferential-direction one side provides the entrance side in the vehicle forward run and the circumferential-direction other side provides the escape side in the vehicle forward run but also to a structure in which the circumferential-direction one side provides the escape side in the vehicle forward run and the circumferential-direction other side provides the entrance side in the vehicle forward run.

The above-structured disk brake pad spring of the invention can prevent the occurrence of brake squeal while not in braking, can prevent the degraded assembling efficiency of a disk brake apparatus and, without increasing the number of parts, can prevent the torque transmission surface and torque receiving surface against rust.

That is, in the disk brake pad spring of the invention, since the paired pads can be elastically pressed inwardly in the radial direction by the paired pressure arms constituting the pressure portion, the attitudes of the pads while not in braking can be stabilized to thereby prevent the occurrence of brake squeal.

Also, the mounting portion can be mounted onto the radial outside portion of the pad support member (for example, the portion for covering the pad from outside in the radial direction) using its own elasticity, the assembling efficiency of a disk brake apparatus to which the pad spring is applied can be prevented against degradation.

Further, since the pad spring is mounted on the same side (outwardly in the radial direction) as the torque transmission surface and torque receiving surface with respect to the radial direction, the holding plate portion to be interposed between the torque transmission surface and torque receiving surface can be formed integrally with the mounting portion and pressure portion. Therefore, according to the invention, without increasing the number of parts, the torque transmission surface and torque receiving surface can be prevented against rust.

What is claimed is:

1. A pad spring for a disk brake, comprising:
   a mounting portion configured to be elastically mounted onto radial outside portions of pad support members of the disk brake;
   a pressure portion having a pair of pressure arms configured to elastically press outer circumferential edges of circumferential-direction one-end portions of back plates of pads of the disk brake inwardly in a radial direction of a rotor of the disk brake; and
   a held plate section formed between torque transmission surfaces of the back plates and torque receiving surfaces of the pad support members,
   wherein the pad spring is an elastic and corrosion-resistant metal plate.

2. The pad spring according to claim 1, wherein
   each of the pads includes a lining and the back plate supporting a back surface of the lining,
   a torque transmission surface is formed in a side edge portion of one side of the back plate in a circumferential direction of the rotor, and is disposed in the radial direction at a position outside of a line of action of a brake tangential force applied to the pads in braking in one direction of the circumferential direction,
   a guided portion is formed in the side edge portion, and is disposed in the radial direction at a position inside of a line of action of a brake tangential force applied to the pads in braking in the other direction of the circumferential direction,
   the pad support member supports the pad so that the pad moves in an axial direction of the rotor,
   a torque receiving surface configured to come in contact with the torque transmission surface so as to support the brake tangential force in the one direction is formed on the pad support member, and
   a guide portion configured to be engaged with the guided portion so as to support the brake tangential force in the other direction is formed on the pad support member.

3. The pad spring according to claim 1, wherein
   the held plate section elastically presses the pads in the other direction of the circumferential direction.

4. The pad spring according to claim 1, wherein
   the pressure arms respectively press the pads in directions in which the pads are separated from each other with respect to an axial direction of the rotor.

5. The pad spring according to claim 1, wherein
   the pad spring is configured to be partially exposed outwardly in the radial direction in a state that the pad spring is mounted to the pad support members.

* * * * *